US012346151B2

(12) United States Patent
Yamane

(10) Patent No.: US 12,346,151 B2
(45) Date of Patent: Jul. 1, 2025

(54) CLOCK RECOVERY CIRCUIT, ERROR RATE MEASUREMENT APPARATUS, AND ERROR RATE MEASUREMENT METHOD

(71) Applicant: ANRITSU CORPORATION, Kanagawa (JP)

(72) Inventor: Kazuhiro Yamane, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 152 days.

(21) Appl. No.: 18/485,814

(22) Filed: Oct. 12, 2023

(65) Prior Publication Data
US 2024/0176387 A1 May 30, 2024

(30) Foreign Application Priority Data
Nov. 29, 2022 (JP) ................. 2022-190657

(51) Int. Cl.
*G06F 1/12* (2006.01)
*H04B 1/7087* (2011.01)

(52) U.S. Cl.
CPC ............. *G06F 1/12* (2013.01); *H04B 1/7087* (2013.01)

(58) Field of Classification Search
CPC .............. G06F 1/08; G06F 1/10; G06F 1/12
See application file for complete search history.

(56) References Cited

U.S. PATENT DOCUMENTS

| 9,036,764 B1* | 5/2015 | Hossain ............... H04L 7/0337 375/376 |
| 11,115,178 B1* | 9/2021 | Lou ......................... H03L 7/099 |
| 2018/0269924 A1 | 9/2018 | Kaji et al. |
| 2019/0058500 A1* | 2/2019 | Lan ....................... H03L 7/0814 |
| 2022/0286159 A1* | 9/2022 | Dai ........................ H04L 43/50 |

FOREIGN PATENT DOCUMENTS

| EP | 0604188 A2 * | 12/1993 | ............ H04L 7/033 |
| JP | 2002-084189 A | 3/2002 | |
| JP | 2018-156647 A | 10/2018 | |

* cited by examiner

*Primary Examiner* — Raymond N Phan
(74) *Attorney, Agent, or Firm* — McDonald Hopkins LLC

(57) ABSTRACT

A clock recovery circuit includes a reference clock generation unit that generates a reference clock subjected to SSC modulation, a clock recovery unit that recovers an SSC modulated clock of a data signal subjected to the SSC modulation in synchronization with the reference clock, and a modulation signal generation unit that generates a modulation signal based on cycle information indicating a cycle of a FM demodulated signal obtained by performing FM demodulation on the SSC modulated clock recovered by the clock recovery unit and slope information indicating a slope of the FM demodulated signal, in which the reference clock generation unit generates the reference clock by performing the SSC modulation on a clock of a VCO with the modulation signal, and feeds back the reference clock subjected to the SSC modulation to the clock recovery unit.

12 Claims, 9 Drawing Sheets

CLOCK RECOVERY CIRCUIT, ERROR RATE MEASUREMENT APPARATUS, AND ERROR RATE MEASUREMENT METHOD

TECHNICAL FIELD

The present invention relates to a clock recovery circuit, an error rate measurement apparatus, and an error rate measurement method, and more particularly to a clock recovery circuit, an error rate measurement apparatus, and an error rate measurement method for recovering a clock from a data signal modulated by a spread-spectrum clock.

BACKGROUND ART

A bit rate of a peripheral component interconnect express (PCI Express) (registered trademark) standard is increased with each generation, is 32 Gbit/sec in non return to zero (NRZ) in Gen5, and is 32 Gbaud (that is, 64 Gbit/sec) in pulse amplitude modulation 4 (PAM4) in Gen6. In a compliance test of the PCI Express standard, the test is carried out on a defined transmission path with a large loss. Therefore, on a reception side, processing compensating the loss of the transmission path from mid-range to high-range frequencies by using an equalizer, such as a continuous time linear equalizer (CTLE) or a decision feedback equalizer (DFE), and reopening an eye opening of a data signal output from a device under test (DUT) is performed.

For example, Gen5 of the PCI Express standard defines a loss of 36 dB at 16 GHz, and Gen6 of the PCI Express standard defines a loss of 32 dB at 16 GHz. However, in a case in which an eye corresponding to a most significant bit (MSB) of a PAM4 signal restored by the equalizer is amplified with a limiting amplifier corresponding to the NRZ, a NRZ waveform in which the eye opening including inter-symbol interference (ISI) peculiar to the PAM4 signal is degraded is obtained. It should be noted that the eye opening of the MSB of the PAM4 signal is theoretically equal to or less than ⅓ of the eye opening of the NRZ signal. A difference between the frequency characteristics of the transmission path and the frequency characteristics of the equalizer is also assumed as a factor of degrade of the eye opening.

In recent years, with the spread of the Internet of things (IoT) or cloud computing, a communication system handles enormous amounts of data, and the speed is increased and serial transmission progresses in the interfaces of various communication devices configuring the communication systems. For example, in a standard of a high speed serial bus, such as a universal serial bus (USB) (registered trademark) or the PCI Express, as an electro-magnetic compatibility (EMC) measure, spread-spectrum clock (SSC) modulation by an SSC that spreads the spectrum of a standard signal is adopted.

The data signal subjected to the SSC modulation (hereinafter, also referred to as "SSC modulated data signal") is generated at a timing synchronized with a reference clock is frequency-swept by an SSC modulated wave having a predetermined modulated frequency as illustrated in FIG. 9A. For example, the SSC modulated wave of the PCI Express standard has a waveform shape of a triangle wave with a cycle of 33 kHz as illustrated in FIG. 9A.

By the way, as one of the indexes for evaluating a quality of the signal in the communication device, a bit error rate (BER), which is defined as a comparison between the number of received data in which a bit error occurs and the total number of received data, is known.

In recent years, many of the various communication devices configuring the communication system do not transmit a clock for synchronization, but transmit only the data signal, and an error rate measurement apparatus in the related art that measures the BER includes a clock recovery device that recovers the clock from the received data signal.

A general-purpose clock recovery device for high-speed serial communication applications, such as a 10G Ethernet (registered trademark) standard, can usually handle a frequency deviation or a bit rate deviation of about ±100 ppm, but for example, in a case in which the SSC modulated data signal of the PCI Express standard having a frequency shift of 5300 ppm at maximum is input to such a clock recovery device, the clock recovery device is unlocked or erroneously operates. Moreover, even in a case in which the clock recovery device operates, it may not be possible to follow the frequency shift of the SSC modulation.

In such a case, the SSC modulated wave obtained by performing frequency modulation (FM) demodulation on the output of the clock recovery device is a distorted waveform that looks like a peak portion of an original triangle wave is cut off as illustrated in FIG. 9A.

Further, in a case in which the clock recovery is performed with the degraded and stressed SSC modulated data signal, as illustrated in a solid line graph of FIG. 9B, the SSC modulated wave obtained by performing the FM demodulation on the output of the clock recovery device may be a waveform with noise or fluctuations caused by superimposition of phase noise (ISI or jitter) on the clock recovered by the clock recovery device, in addition to being the distorted waveform that looks like the peak portion of the original triangle wave as illustrated by a broken line. In such a case, it is considered that the frequency deviation between the SSC modulated data signal input to the clock recovery device and a reference clock is out of an allowable range of the clock recovery device, and normal clock recovery is not performed.

In the related art, as illustrated in FIG. 10, a phase synchronization circuit PS1 is known, which includes a phase comparator 51a, a loop filter 52a, a voltage-controlled oscillator 53a, a signal input terminal 57a, a signal output terminal 59a, and a voltage tracking circuit VT1 as an additional loop, and can be used as the clock recovery device (see, for example, Patent Document 1). The voltage tracking circuit VT1 includes a reference voltage generator 58a, a differential amplifier 54a, a filter 55a, and an adder 56a.

The voltage tracking circuit VT1 controls an average value of an output voltage of the phase comparator 51a to be matched with an output voltage $V_R$ of the reference voltage generator 58a. Since the voltage tracking circuit VT1 performs feedback control to maintain a duty ratio of the output voltage of the phase comparator 51a, the phase synchronization circuit PS1 has a greatly expanded lock range than a phase synchronization circuit without the voltage tracking circuit VT1.

RELATED ART DOCUMENT

Patent Document

[Patent Document 1] JP-A-2002-84189

DISCLOSURE OF THE INVENTION

Problem that the Invention is to Solve

However, even in a case in which the phase synchronization circuit PS1 including the voltage tracking circuit VT1 disclosed in Patent Document 1 is used, there is a problem that there is a limit to the expansion of the lock range, and the phase synchronization circuit PS1 is not suitable for the clock recovery corresponding to the degraded and stressed SSC modulated data signal with a large frequency shift due to the SSC modulation.

The present invention has been made to solve such problems in the related art, and is to provide a clock recovery circuit, an error rate measurement apparatus, and an error rate measurement method which can recover a clock from a degraded and stressed SSC modulated data signal with a large frequency shift due to the SSC modulation.

Means for Solving the Problem

In order to solve the above problems, an aspect of the present invention relates to a clock recovery circuit including: a reference clock generation unit that generates a reference clock subjected to spread spectrum clock (SSC) modulation; a clock recovery unit that recovers an SSC modulated clock of a data signal subjected to the SSC modulation at a predetermined SSC modulated frequency in synchronization with the reference clock; a frequency modulation (FM) demodulation unit that performs FM demodulation on the SSC modulated clock recovered by the clock recovery unit to generate an FM demodulated signal; and a modulation signal generation unit that acquires cycle information indicating a cycle of the FM demodulated signal and slope information indicating a slope of the FM demodulated signal to generate a modulation signal based on the acquired cycle information and slope information, in which the reference clock generation unit includes a voltage-controlled oscillator that outputs an output signal of a frequency corresponding to an input control voltage, a phase comparator that outputs a phase difference signal corresponding to a phase difference between a base clock having a predetermined frequency and the output signal of the voltage-controlled oscillator, a charge pump that generates a charge/discharge current in response to the phase difference signal, a loop filter that outputs a signal obtained by removing a high frequency component from the charge/discharge current, and a signal synthesis unit that adds the modulation signal generated by the modulation signal generation unit and the output of the loop filter, and the voltage-controlled oscillator generates the reference clock by modulating a clock of the voltage-controlled oscillator by receiving the output of the signal synthesis unit as the control voltage, to output the generated reference clock as the output signal.

With this configuration, the clock recovery circuit according to the aspect of the present invention generates the FM demodulated signal obtained by performing the FM demodulation on the output of the clock recovery unit, generates the modulation signal that is an SSC modulated wave having the cycle and the slope of the FM demodulated signal, generates the reference clock by performing the SSC modulation on the clock of the voltage-controlled oscillator using the modulation signal, and feeds back the reference clock subjected to the SSC modulation to the clock recovery unit. With this configuration, since the clock recovery circuit according to the aspect of the present invention can restore the modulation signal having an original SSC modulated frequency from the FM demodulated signal, the clock recovery circuit can recover the SSC modulated clock by improving the durability of the clock recovery unit by making the frequency of the SSC modulated data signal to follow the frequency of the reference clock such that a frequency deviation between a degraded and stressed SSC modulated data signal with a large frequency shift due to the SSC modulation and the reference clock is minimized.

In addition, in the clock recovery circuit according to the aspect of the present invention, the modulation signal generation unit may include a cycle information acquisition unit that acquires the cycle information, a slope information acquisition unit that acquires the slope information, and a triangle wave signal generator that generates a triangle wave signal based on the cycle information and the slope information.

With this configuration, the clock recovery circuit according to the aspect of the present invention generates the triangle wave signal having the cycle and the slope of the FM demodulated signal by digital calculation, and generates the modulation signal by performing digital-analog conversion of the triangle wave signal. With this configuration, the clock recovery circuit according to the aspect of the present invention can restore the triangle wave signal having the original SSC modulated frequency from the FM demodulated signal to generate the modulation signal.

In addition, in the clock recovery circuit according to the aspect of the present invention, the cycle information acquisition unit may use a direct current average value level of the FM demodulated signal as a first threshold value to acquire a period in which a level of the FM demodulated signal is continuously equal to or more than the first threshold value or a period in which the level of the FM demodulated signal is continuously equal to or less than the first threshold value, as the cycle information.

With this configuration, the clock recovery circuit according to the aspect of the present invention can use the direct current average value level of the FM demodulated signal as the first threshold value to acquire a half period of the cycle of the FM demodulated signal as the cycle information.

In addition, in the clock recovery circuit according to the aspect of the present invention, the slope information acquisition unit may include a high/low level period acquisition unit that acquires a high level period in which the level of the FM demodulated signal is continuously equal to or more than a second threshold value different from the first threshold value or a low level period in which the level of the FM demodulated signal is continuously equal to or less than the second threshold value, a difference calculation unit that calculates a difference between the cycle information and the high level period or the low level period, and a slope information output unit that outputs an absolute value of a value obtained by dividing a difference between the first threshold value and the second threshold value by a half of the difference calculated by the difference calculation unit, as the slope information.

With this configuration, the clock recovery circuit according to the aspect of the present invention can use the second threshold value different from the first threshold value to acquire the high level period or the low level period, and can acquire the slope information of the modulation signal from the difference between the high level period or the low level period and the period of the half of the cycle of the FM demodulated signal.

In addition, in the clock recovery circuit according to the aspect of the present invention, the triangle wave signal generator may include a pulse signal output unit that outputs a pulse signal for each half period of the cycle information, a frequency shift direction information output unit that outputs frequency shift direction information indicating whether a slope of the triangle wave signal is positive or negative at a timing of the pulse signal, a slope output unit that outputs the slope obtained by multiplying the frequency shift direction information and the slope information, an amplitude change amount calculation unit that calculates a value obtained by multiplying the slope output from the slope output unit by a predetermined clock cycle, as an amplitude change amount for each predetermined clock cycle, and a cumulative addition circuit that generates the triangle wave signal by cumulatively adding the amplitude change amount calculated by the amplitude change amount calculation unit for each predetermined clock cycle.

In addition, the clock recovery circuit according to the aspect of the present invention may further include: a frequency divider that divides a frequency of the SSC modulated clock recovered by the clock recovery unit to output the SSC modulated clock to the FM demodulation unit; and a frequency division ratio control unit that controls a frequency division ratio of the frequency divider, in which the FM demodulation unit includes a delay unit that delays and outputs the SSC modulated clock whose frequency is divided by the frequency divider, an exclusive OR circuit that calculates an exclusive OR of the output of the frequency divider and the output of the delay unit, and a low pass filter that smooths the output of the exclusive OR circuit to generate the FM demodulated signal, and the frequency division ratio control unit controls the frequency division ratio based on a bit rate of the data signal such that a maximum frequency of the SSC modulated clock input to the exclusive OR circuit is equal to or less than ¼ of an operation upper limit frequency of the exclusive OR circuit.

With this configuration, the clock recovery circuit according to the aspect of the present invention can recover the SSC modulated clock from the SSC modulated data signal having a large frequency shift while ensuring a demodulation resolution of the exclusive OR circuit.

In addition, another aspect of the present invention relates to an error rate measurement apparatus including: a signal reception unit that receives a data signal subjected to SSC modulation at a predetermined SSC modulated frequency; and an error rate calculation unit that calculates a bit error rate of bit string data constituting the data signal received by the signal reception unit, in which the signal reception unit includes the clock recovery circuit according to any one of the aspects, and extracts the bit string data constituting the data signal at a timing of the SSC modulated clock recovered from the data signal by the clock recovery circuit.

With this configuration, the error rate measurement apparatus according to the aspect of the present invention can receive the SSC modulated data signal transmitted from a device under test, and can generate the SSC modulated clock from the SSC modulated data signal by using the clock recovery circuit according to any one of the aspects. Further, the error rate measurement apparatus according to the aspect of the present invention can extract the bit string data constituting the SSC modulated data signal at the timing of the generated SSC modulated clock, and can measure a BER of the bit string data.

In addition, still another aspect of the present invention relates to an error rate measurement method including: a signal reception step of receiving a data signal subjected to SSC modulation at a predetermined SSC modulated frequency; and an error rate calculation step of calculating a bit error rate of bit string data constituting the data signal received in the signal reception step, in which, in the signal reception step, the bit string data constituting the data signal at a timing of the SSC modulated clock recovered from the data signal is extracted by the clock recovery circuit according to any one of the aspects.

In addition, the error rate measurement method according to the aspect of the present invention may further include, in the acquisition of the cycle information according to any one of the aspects, using a direct current average value level of the FM demodulated signal as a first threshold value to acquire a period in which a level of the FM demodulated signal is continuously equal to or more than the first threshold value or a period in which the level of the FM demodulated signal is continuously equal to or less than the first threshold value, as the cycle information.

In addition, the error rate measurement method according to the aspect of the present invention may further include, in the acquisition of the slope information according to any one of the aspects, acquiring a high level period in which the level of the FM demodulated signal is continuously equal to or more than a second threshold value different from the first threshold value or a low level period in which the level of the FM demodulated signal is continuously equal to or less than the second threshold value; calculating a difference between the cycle information and the high level period or the low level period; and outputting an absolute value of a value obtained by dividing a difference between the first threshold value and the second threshold value by a half of the difference, as the slope information.

In addition, the error rate measurement method according to the aspect of the present invention may further include, in the generation of the triangle wave signal according to any one of the aspects, outputting a pulse signal for each half period of the cycle information; outputting frequency shift direction information indicating whether a slope of the triangle wave signal is positive or negative at a timing of the pulse signal; outputting the slope obtained by multiplying the frequency shift direction information and the slope information; calculating a value obtained by multiplying the slope by a predetermined clock cycle, as an amplitude change amount for each predetermined clock cycle; and generating the triangle wave signal by cumulatively adding the amplitude change amount for each predetermined clock cycle.

Advantage of the Invention

The present invention provides the clock recovery circuit, the error rate measurement apparatus, and the error rate measurement method which can recover the clock from the degraded and stressed SSC modulated data signal.

BRIEF DESCRIPTION OF THE DRAWINGS

FIG. 5A illustrates an example in a case in which a second threshold value is larger than a first threshold value, and FIG. 5B illustrates an example in a case in which the second threshold value is smaller than the first threshold value.

BEST MODE FOR CARRYING OUT THE INVENTION

Hereinafter, embodiments of a clock recovery circuit, an error rate measurement apparatus, and an error rate measurement method according to the present invention will be described with reference to the drawings.

First Embodiment

Figure 1:
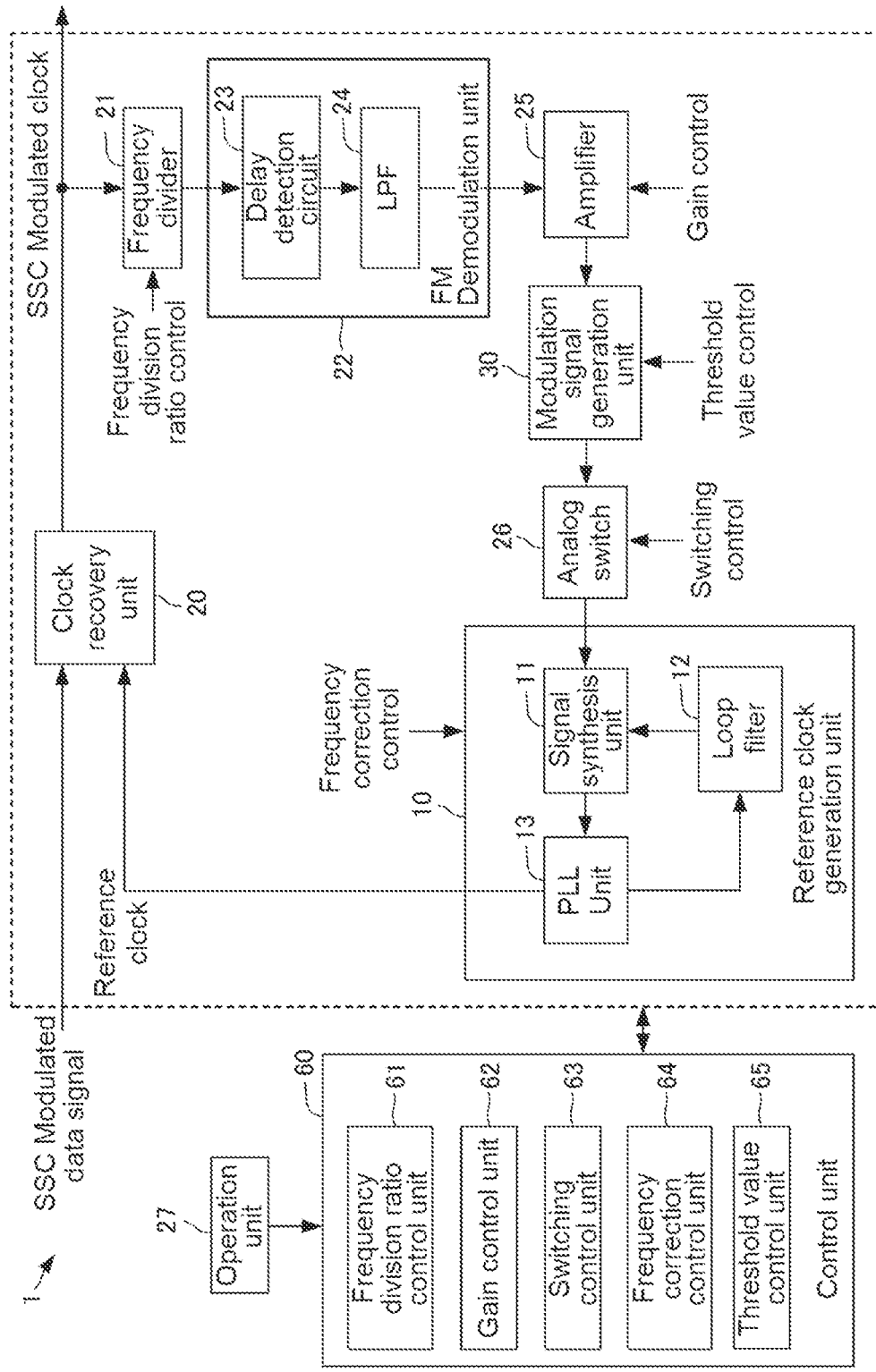
FIG. 1 is a block diagram illustrating a configuration of a clock recovery circuit according to a first embodiment of the present invention.

A clock recovery circuit 1 according to a first embodiment of the present invention illustrated in FIG. 1 includes a reference clock generation unit 10 that generates a reference clock subjected to SSC modulation, a clock recovery unit 20, a frequency divider 21, an FM demodulation unit 22, an amplifier 25, an analog switch 26, an operation unit 27, a modulation signal generation unit 30, and a control unit 60. The control unit 60 includes a frequency division ratio control unit 61, a gain control unit 62, a switching control unit 63, a frequency correction control unit 64, and a threshold value control unit 65.

Hereinafter, a configuration and an operation of each unit will be mainly described in a case in which the analog switch 26, which will be described later, is set to an on-state (hereinafter, also referred to as "enabled") by the switching control unit 63.

Figure 2:
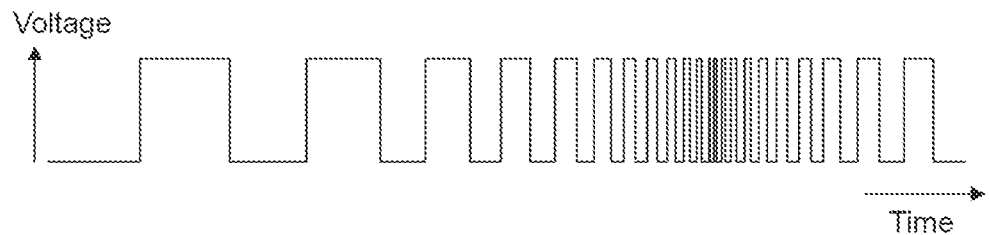
FIG. 2 is a diagram illustrating an example of a waveform of an SSC modulated clock output from a clock recovery unit provided in the clock recovery circuit according to the first embodiment of the present invention.

The clock recovery unit 20 recovers an SSC modulated clock of an SSC modulated data signal subjected to the SSC modulation at a predetermined SSC modulated frequency in synchronization with the reference clock generated by the reference clock generation unit 10. In other words, the clock recovered from the data signal subjected to the SSC modulation by the clock recovery unit 20 is a clock subjected to the SSC modulation like the data signal. A general-purpose clock recovery device for high-speed serial communication applications can be used as the clock recovery unit 20. Here, the SSC modulated frequency is defined for each communication standard, and is, for example, a frequency in a range of 30 to 33 kHz. For example, the SSC modulated clock output from the clock recovery unit 20 has a changed pulse rising (or falling) interval or pulse width, as illustrated in FIG. 2, according to the frequency shift of the SSC modulation and the SSC modulated frequency.

The frequency divider 21 divides a frequency of the SSC modulated clock recovered by the clock recovery unit 20 to a frequency that is easy to handle in the FM demodulation unit 22 at the subsequent stage, and outputs the SSC modulated clock to the FM demodulation unit 22. In a case in which the FM demodulation unit 22 can perform the FM demodulation on the output of the clock recovery unit 20 as it is, the frequency divider 21 may be omitted.

Figure 9A:
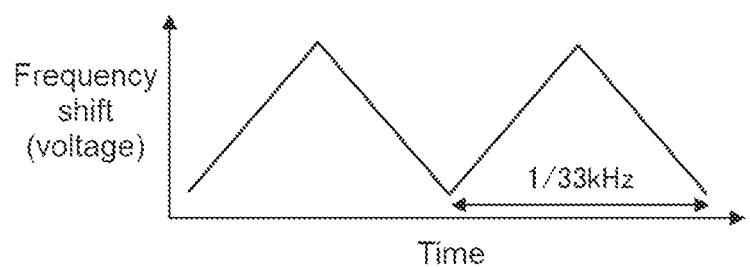
FIG. 9A is a diagram illustrating an example of a waveform of an SSC modulated wave having a predetermined SSC modulated frequency.

The FM demodulation unit 22 performs the FM demodulation on the SSC modulated clock recovered by the clock recovery unit 20 to generate an FM demodulated signal having the SSC modulated frequency defined by the communication standard. The FM demodulated signal has a waveform shape of a triangle wave with a cycle of 33 kHz as illustrated in FIG. 9A, for example, in a PCI Express standard. Although there are various methods of the FM demodulation, the clock recovery circuit 1 according to the present embodiment adopts a delay detection method, which is advantageous for widening a bandwidth, in order to realize the clock recovery of a wideband (wide bit rate range) that can be adopted in an error rate measurement apparatus which will be described later. That is, the FM demodulation unit 22 performs delay detection on the SSC modulated clock whose frequency is divided by the frequency divider 21, and includes a delay detection circuit 23 and a low pass filter (LPF) 24.

Figure 3:
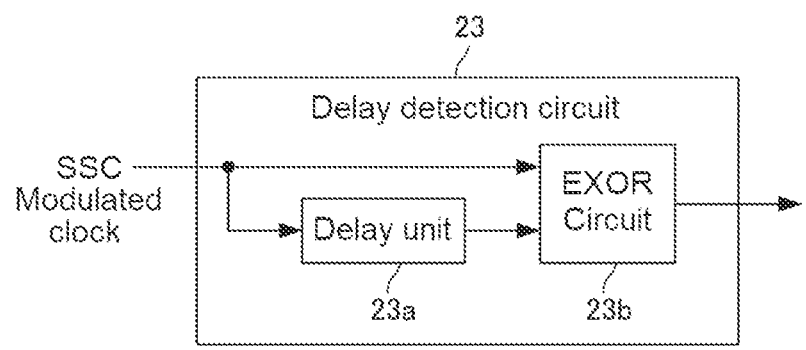
FIG. 3 is a block diagram illustrating a configuration of a delay detection circuit provided in the clock recovery circuit according to the first embodiment of the present invention.

As illustrated in FIG. 3, the delay detection circuit 23 includes a delay unit 23a and a high-speed operating exclusive OR (EXOR) circuit 23b. In order to ensure a demodulation resolution of the EXOR circuit 23b, it is desirable that a maximum frequency of the SSC modulated clock input to the EXOR circuit 23b is equal to or less than ¼ of an operation upper limit frequency of the EXOR circuit 23b. Therefore, the frequency division ratio control unit 61 controls a frequency division ratio of the frequency divider 21 based on a bit rate of the SSC modulated data signal such that the maximum frequency of the SSC modulated clock input to the EXOR circuit 23b is equal to or less than ¼ of the operation upper limit frequency of the EXOR circuit 23b.

The delay unit 23a delays and outputs the SSC modulated clock whose frequency is divided by the frequency divider 21 by a ¼ cycle of the maximum frequency. In a case in which the frequency of the SSC modulated clock input to the EXOR circuit 23b is low, a delay time by the delay unit 23a is increased, and a tradeoff occurs between the implementation scale or delay stability, and thus it is desirable to set the frequency division ratio of the frequency divider 21 in consideration of this point.

The delay unit 23a can be configured of, for example, an element or device such as a fixed delay element or a variable delay device, or can be configured by a method such as extending a transmission path of a cable or a print wiring board.

The EXOR circuit 23b calculates an exclusive OR of the SSC modulated clock whose frequency is divided by the frequency divider 21 and the SSC modulated clock whose frequency is divided by the frequency divider 21 and which is delayed by the delay unit 23a. Since the maximum frequency of the SSC modulated clock input from the delay unit 23a is delayed by the ¼ cycle, the EXOR circuit 23b outputs a clock having a frequency twice the frequency of the SSC modulated clock input to the EXOR circuit 23b.

The LPF 24 smooths the output of the EXOR circuit 23b to generate the FM demodulated signal having the SSC modulated frequency defined by the communication standard. In this case, in a case in which there is no error in the delay time added to the SSC modulated clock by the delay unit 23a at the maximum frequency of the SSC modulated clock input to the EXOR circuit 23b, a duty ratio of the output waveform of the EXOR circuit 23b is 50%, and thus a direct current average value level (hereinafter, also referred to as "DC offset") of the output of the LPF 24 is a half of a voltage level of an output amplitude of the EXOR circuit 23b.

It is possible to suitably use the LPF 24 having a cutoff frequency in a range of, for example, about 3 to 10 times 33 kHz, which is the SSC modulated frequency, depending on the noise of the FM demodulated signal. Since the LPF 24 has a relatively low cutoff frequency in this way, the LPF 24 can be configured of a first order RC low pass filter. However, the LPF 24 is not limited to an RC low pass filter and its order, and may be configured of an operational amplifier or an LC low pass filter.

In a case in which a frequency range of the SSC modulated clock input to the EXOR circuit 23b is changed, the duty ratio of the output waveform of the EXOR circuit 23b is changed, and the direct current average value level of the output of the EXOR circuit 23b is also changed. In a case in which the maximum frequency of the SSC modulated clock input to the EXOR circuit 23b is equal to or more than ¼ of the operation upper limit frequency of the EXOR circuit 23b, the frequency division ratio control unit 61 controls the frequency division ratio of the frequency divider 21 based on the bit rate of the SSC modulated data signal such that the maximum frequency of the SSC modulated clock input to the EXOR circuit 23b is equal to or less than ¼ of the operation upper limit frequency of the EXOR circuit 23b again.

In a case in which a delay amount of the delay unit 23a is a fixed delay amount, when the frequency of the SSC modulated clock input to the EXOR circuit 23b is decreased, the DC offset and the detection efficiency of the output of the EXOR circuit 23b after passing through the LPF 24 are decreased.

Therefore, the amplifier 25 amplifies the FM demodulated signal generated by the FM demodulation unit 22 with the gain set by the gain control unit 62. For example, the gain control unit 62 sets, in the amplifier 25, the gain according to a known frequency shift amount of the SSC modulation of the SSC modulated data signal input to the clock recovery circuit 1.

For example, since the SSC modulated data signal with the known frequency shift amount is input to the clock recovery circuit 1, the gain control unit 62 grasps, in advance, a relationship between the frequency shift amount of the SSC modulated data signal and the amplitude of the FM demodulated signal output from the FM demodulation unit 22 based on the FM demodulation characteristics of the FM demodulation unit 22.

Further, the gain control unit 62 grasps, in advance, a relationship between a frequency shift amount of the reference clock generated by the reference clock generation unit 10 and the amplitude of the triangle wave signal generated by the triangle wave signal generator 40 based on the frequency modulation characteristics with respect to the control voltage of a voltage-controlled oscillator (VCO) 14 of a PLL unit 13 at the subsequent stage.

Further, based on these relationships, the gain control unit 62 grasps, in advance, the gain to be set in the amplifier 25 in order to obtain the frequency shift amount of the SSC modulation necessary in the reference clock generation unit 10.

By adjusting the gain of the amplifier 25, the gain control unit 62 adjusts the frequency shift of the reference clock generated by the reference clock generation unit 10 at the subsequent stage, thereby making the frequency deviation between the SSC modulated data signal and the reference clock as small as possible within a lockable range of the clock recovery unit 20.

It should be noted that a DC offset component, which fluctuates depending on the frequency range of the SSC modulated clock, is not necessary in the reference clock generation unit 10 at the subsequent stage. Therefore, it is desirable that the amplifier 25 can amplify only an AC component of the output of the LPF 24, that is, the waveform of the SSC modulated wave by appropriately providing a coupling capacitor, a known DC offset cancellation circuit, or the like between the FM demodulation unit 22 and the amplifier 25.

Alternatively, there is also a method in which a variable delay device with a variable delay amount is used as the delay unit 23a, and an optimum delay amount an optimum delay amount for suppressing the DC offset of the output of the LPF 24 and the deterioration of the detection efficiency is set according to the frequency range of the SSC modulated clock.

The modulation signal generation unit 30 acquires cycle information indicating a cycle of the FM demodulated signal amplified by the amplifier 25 and slope information indicating a slope of the FM demodulated signal amplified by the amplifier 25, and generates the modulation signal based on the acquired cycle information and slope information. That is, the waveform of the modulation signal generated by the modulation signal generation unit 30 is a waveform having the cycle indicated by the cycle information and the slope indicated by the slope information.

Figure 4:
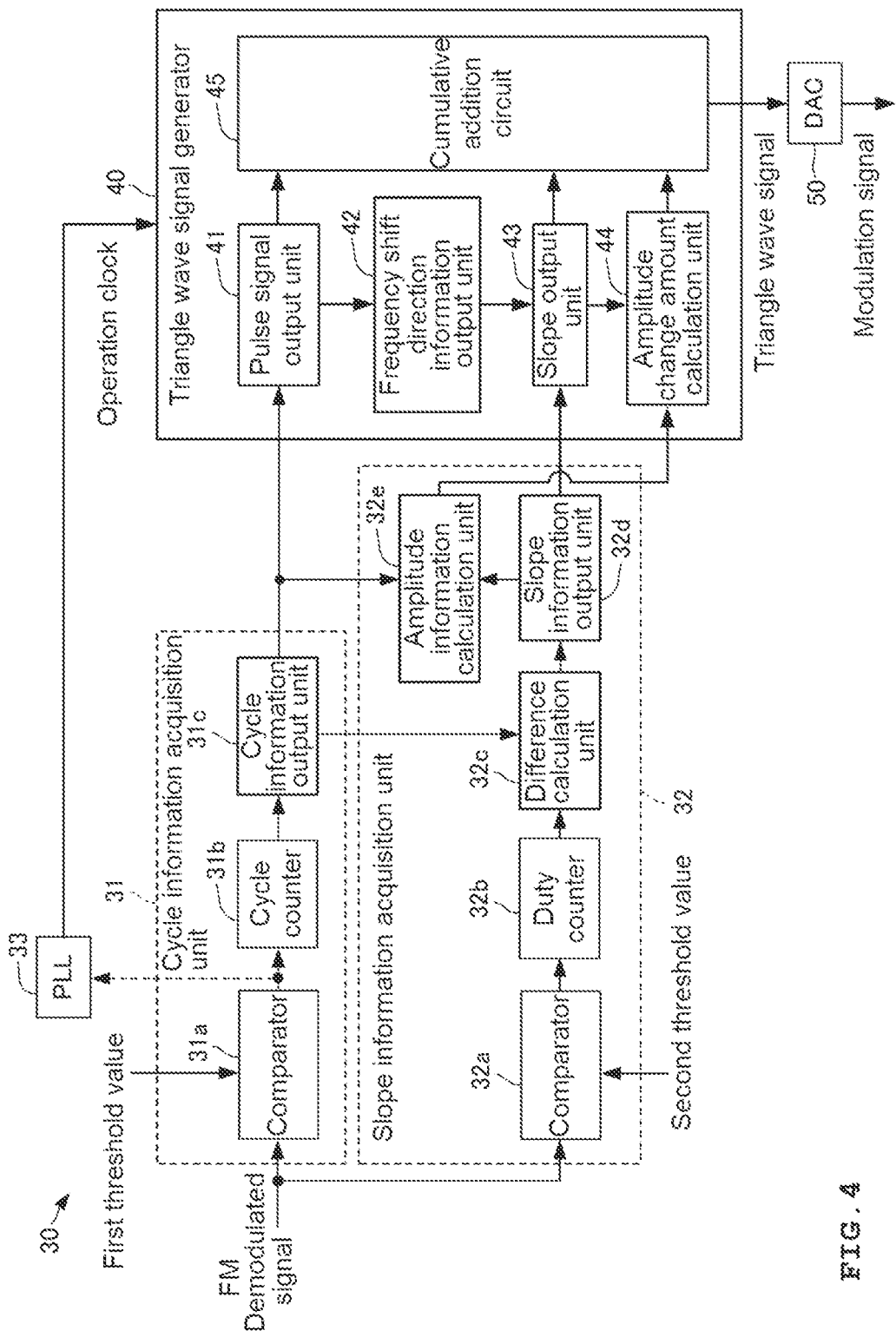
FIG. 4 is a block diagram illustrating a configuration of a modulation signal generation unit provided in the clock recovery circuit according to the first embodiment of the present invention.

As illustrated in FIG. 4, the modulation signal generation unit 30 includes a cycle information acquisition unit 31, a slope information acquisition unit 32, a phase locked loop (PLL) 33, a triangle wave signal generator 40, and a digital analog converter (DAC) 50.

The cycle information acquisition unit 31 acquires the cycle information of the FM demodulated signal amplified by the amplifier 25, and includes a comparator 31a, a cycle counter 31b, and a cycle information output unit 31c.

The comparator 31a binarizes the FM demodulated signal amplified by the amplifier 25 with a first threshold value set by the threshold value control unit 65. The first threshold value is set to a value of a central portion of the waveform of the triangle wave of the FM demodulated signal amplified by the amplifier 25, that is, the direct current average value level of the FM demodulated signal. For example, in a case in which the DC offset is canceled at the subsequent stage of the LPF 24, the voltage of the first threshold value is 0V.

Figure 5A:
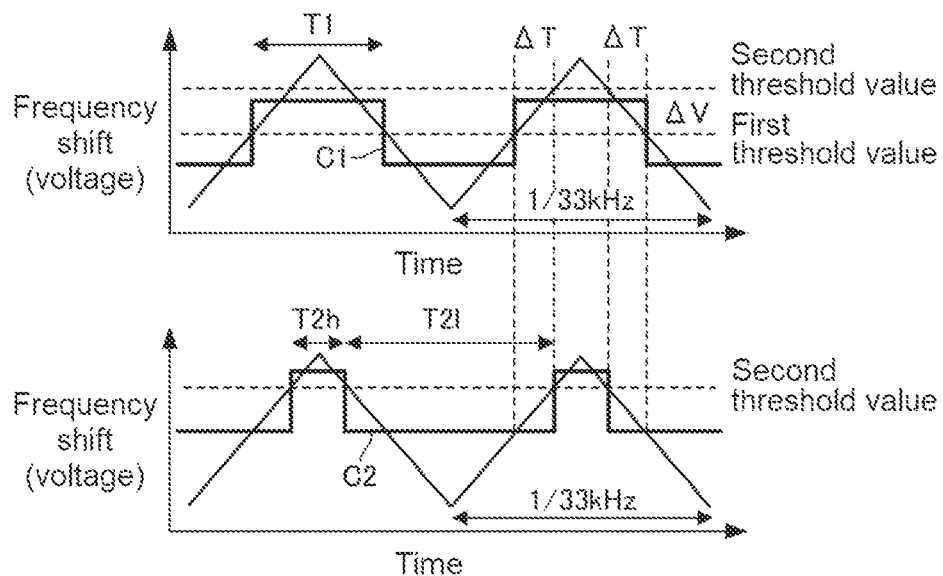
FIGS. 5A and 5B are diagrams for describing a method of acquiring a cycle and a slope of an FM demodulated signal.
Figure 5B:
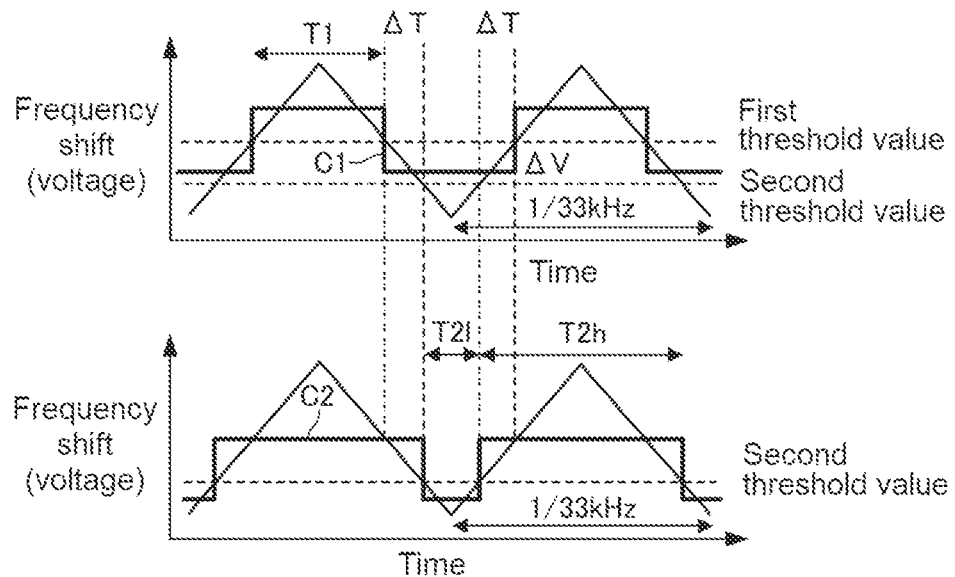

Upper parts of FIGS. 5A and 5B illustrate output C1 of the comparator 31a in a case in which the first threshold value is set to the central portion of the waveform of the triangle wave of the FM demodulated signal. That is, the output C1 of the comparator 31a is at a high level in a period in which a level of the FM demodulated signal is continuously equal to or more than the first threshold value. On the other hand, the output C1 of the comparator 31a is at a low level in a period in which the level of the FM demodulated signal is continuously equal to or less than the first threshold value.

The cycle counter 31b counts and acquires a period T1 in which the output C1 of the comparator 31a is continuously at the high level or the low level. That is, the period T1 counted by the cycle counter 31b is a half of the cycle of the triangle wave of the FM demodulated signal.

The cycle information output unit 31c acquires the period T1 counted by the cycle counter 31b as the cycle information of the FM demodulated signal, and outputs the period T1 to the triangle wave signal generator 40.

The slope information acquisition unit 32 acquires the slope information of the FM demodulated signal, and includes a comparator 32a, a duty counter 32b, a difference calculation unit 32c, a slope information output unit 32d, and an amplitude information calculation unit 32e.

The comparator 32a binarizes the FM demodulated signal amplified by the amplifier 25 with a second threshold value set by the threshold value control unit 65. For example, as illustrated in FIG. 5A, the second threshold value is set to a value that is larger than the first threshold value and does not exceed a peak of the waveform of the triangle wave of the FM demodulated signal amplified by the amplifier 25. Alternatively, as illustrated in FIG. 5B, the second threshold value is set to a value that is smaller than the first threshold value and does not exceed the peak of the waveform of the triangle wave of the FM demodulated signal amplified by the amplifier 25.

A lower part of FIG. 5A illustrates output C2 of the comparator 32a in a case in which the second threshold value is set to a value larger than the first threshold value. That is, the output C2 of the comparator 32a is at a high level in a period in which a level of the FM demodulated signal is continuously equal to or more than the second threshold value. On the other hand, the output C2 of the comparator 32a is at a low level in a period in which the level of the FM demodulated signal is continuously equal to or less than the second threshold value.

A lower part of FIG. 5B illustrates output C2 of the comparator 32a in a case in which the second threshold value is set to a value smaller than the first threshold value. That is, the output C2 of the comparator 32a is at a high level in a period in which a level of the FM demodulated signal is continuously equal to or more than the second threshold value. On the other hand, the output C2 of the comparator 32a is at a low level in a period in which the level of the FM demodulated signal is continuously equal to or less than the second threshold value.

The duty counter 32b counts and acquires a high level period T2h in which the output C2 of the comparator 32a is continuously at a high level, or a low level period T2l in which the output C2 of the comparator 32a is continuously at a low level. The duty counter 32b configures a high/low level period acquisition unit.

For example, in a case in which the output of the comparator 32a is a constant value over a period of at least twice the period T1 of the FM demodulated signal output from the cycle information output unit 31c, the threshold value control unit 65 determines that there is a possibility that the second threshold value set in the comparator 32a exceeds the peak of the waveform of the triangle wave of the FM demodulated signal, and the second threshold value is not appropriate. In this case, the threshold value control unit 65 changes the second threshold value set in the comparator 32a such that the output C2 with an appropriate duty ratio is obtained. Further, in a case in which the frequency shift amount of the SSC modulation of the SSC modulated data signal is unknown, the threshold value control unit 65 can search for an appropriate second threshold value that does not exceed the peak of the waveform of the triangle wave of the FM demodulated signal by monitoring the output C2 of the comparator 32a while changing the second threshold value. In this case, a candidate for the second threshold value used during the search may be settable in the comparator 32a by the DAC or the like.

Further, the threshold value control unit 65 can calculate, as the amplitude of the FM demodulated signal, a difference between an upper limit second threshold value at which the output of the comparator 32a is not a constant value and a lower limit second threshold value at which the output of the comparator 32a is not a constant value. The amplitude of the FM demodulated signal calculated by the threshold value control unit 65 may be output to the gain control unit 62 in a case in which the gain control unit 62 grasps a relationship between the frequency shift amount of the SSC modulated data signal and the amplitude of the FM demodulated signal output from the FM demodulation unit 22.

The difference calculation unit 32c calculates a difference $2 \times \Delta T$ between the period T1 of the FM demodulated signal acquired by the cycle information acquisition unit 31 and the high level period T2h or low level period T2l acquired by the duty counter 32b.

The slope information output unit 32d outputs, as the slope information of the FM demodulated signal, an absolute value of a value obtained by dividing a difference $\Delta V$ between the first threshold value and the second threshold value by $\Delta T$, which is a half of the difference calculated by the difference calculation unit 32c, to the triangle wave signal generator 40.

It should be noted that, in a case in which fluctuations occur in the cycle of the FM demodulated signal and time information on a high level or a low level of the outputs of the comparators 31a and 32a, by performing the following averaging in the slope information output unit 32d, the influence of the fluctuations can be reduced.

For example, the slope information output unit 32d may output, as the slope information of the FM demodulated signal, an absolute value of a value obtained by dividing $\Delta V$ by a value obtained by averaging or moving averaging $\Delta T$ over a predetermined period to the triangle wave signal generator 40.

Alternatively, the slope information output unit 32d may output, as the slope information of the FM demodulated signal, an absolute value of a value obtained by dividing $\Delta V$ by a value obtained by averaging or moving averaging a half $\Delta Th$ of the difference calculated by the difference calculation unit 32c using the high level period T2h and a half $\Delta Tl$ of the difference calculated by the difference calculation unit 32c using the low level period T2l to the triangle wave signal generator 40.

The amplitude information calculation unit 32e calculates the amplitude of the triangle wave signal based on a product of the slope information output from the slope information output unit 32d and the cycle information output from the cycle information output unit 31c. The amplitude of the triangle wave signal calculated by the amplitude information calculation unit 32e may be output to the gain control unit 62 in a case in which the gain control unit 62 grasps a relationship between the frequency shift amount of the SSC modulation and the amplitude of the triangle wave signal.

It should be noted that, in a case in which the frequency shift amount of the SSC modulation is known as in the PCI Express standard, the clock recovery circuit 1 according to the present embodiment omits the calculation of the amplitude information by the amplitude information calculation unit 32e and need only acquire the cycle information by the cycle information output unit 31c.

The PLL 33 inputs the clock obtained by multiplying the binarized output C1 of the comparator 31a to the triangle wave signal generator 40 as an operation clock. That is, the PLL 33 inputs the operation clock, which is synchronized with a timing of the FM demodulated signal input to the modulation signal generation unit 30, to the triangle wave signal generator 40. Alternatively, a clock sufficiently faster than the cycle of the triangle wave of the FM demodulated signal may be used as the operation clock to operate the triangle wave signal generator 40 asynchronously.

It should be noted that the number of comparators may be one. In this case, for example, the modulation signal generation unit 30 need only set the second threshold value in the comparator 31a to acquire the output C2 after setting the first threshold value in the comparator 31a to acquire the output C1.

Although an analog digital converter (ADC) can be used instead of the comparators 31a and 32a, in a case in which the ADC is used, there is a problem that the cost is increased or a problem that the frequency deviation between the SSC modulated data signal input to the clock recovery unit 20 and the reference clock is increased due to the delay of a generation start timing of the triangle wave signal by the triangle wave signal generator 40. On the other hand, in a case in which the comparator is used, processing can be performed in which the cost and the delay in the output of the triangle wave signal from the triangle wave signal generator 40 are suppressed.

The triangle wave signal generator 40 generates the triangle wave signal by digital calculation based on the cycle information acquired by the cycle information acquisition unit 31 and the slope information acquired by the slope information acquisition unit 32, and is configured on, for example, a field programmable gate array (FPGA) or an application specific integrated circuit (ASIC). The triangle wave signal generator 40 includes a pulse signal output unit 41, a frequency shift direction information output unit 42, a slope output unit 43, an amplitude change amount calculation unit 44, and a cumulative addition circuit 45.

The pulse signal output unit 41 outputs a pulse signal for each period of the half of the period T1, that is, for each ¼ cycle of the waveform of the triangle wave signal based on the cycle information output from the cycle information output unit 31c.

The frequency shift direction information output unit 42 outputs frequency shift direction information consisting of +1 or −1 value indicating whether the slope of the waveform of the triangle wave signal is positive or negative for each timing of the pulse signal output from the pulse signal output unit 41, that is, for each ¼ cycle of the waveform of the FM demodulated signal. For example, the frequency shift direction information is −1, −1, +1, +1, or the like.

The slope output unit 43 outputs a value obtained by multiplying the frequency shift direction information output from the frequency shift direction information output unit 42 and the slope information of the FM demodulated signal acquired by the slope information acquisition unit 32, that is, the slope of the waveform of the triangle wave signal.

The amplitude change amount calculation unit 44 calculates a value obtained by multiplying the slope of the waveform of the triangle wave signal output from the slope output unit 43 by a predetermined clock cycle Tclk of the operation clock of the triangle wave signal generator 40 as an amplitude change amount for each predetermined clock cycle Tclk, and outputs the calculated amplitude change amount to the cumulative addition circuit 45. Alternatively, the amplitude change amount calculation unit 44 may calculate the amplitude change amount for each clock cycle Tclk such that the amplitude of the triangle wave signal obtained by the cumulative addition circuit 45 is the amplitude of the triangle wave signal calculated by the amplitude information calculation unit 32e.

The cumulative addition circuit 45 cumulatively adds the amplitude change amount calculated by the amplitude change amount calculation unit 44 for each predetermined clock cycle Tclk, thereby generating the triangle wave signal. It should be noted that the pulse signal output unit 41, the frequency shift direction information output unit 42, the slope output unit 43, the amplitude change amount calculation unit 44, and the cumulative addition circuit 45 receive the input of the operation clock that gives the predetermined clock cycle Tclk described above from the PLL 33.

It should be noted that, as the operation clock input to the triangle wave signal generator 40, it is possible to use a clock other than the clock output from the PLL 33 described above. In this case, in order to eliminate a time error between the FM demodulated signal input to the modulation signal generation unit 30 and the operation clock, it is desirable that the cumulative addition circuit 45 appropriately performs fine adjustment processing, such as discontinuously shifting and outputting a timing of the beginning of the waveform of the triangle wave signal with the resolution of the clock cycle Tclk.

The DAC 50 performs the digital-analog conversion of the triangle wave signal generated by the triangle wave signal generator 40 to generate the modulation signal.

The analog switch 26 switches the feedback of the FM demodulated signal amplified by the amplifier 25 to the reference clock generation unit 10 at the subsequent stage between "enabled" and "disabled" under the control of the switching control unit 63. For example, in a case in which the data signal input to the clock recovery circuit 1 is the SSC modulated data signal, the switching control unit 63 performs control of switching the analog switch 26 to "enabled" in order to superimpose the modulation signal on the reference clock in the reference clock generation unit 10. On the other hand, in a case in which the data signal input to the clock recovery circuit 1 is a signal that is not subjected to the SSC modulation, the switching control unit 63 performs control of switching the analog switch 26 to "disabled", which is an off-state, in order to prevent an unnecessary modulation signal from being superimposed on the reference clock in the reference clock generation unit 10.

Figure 9B:
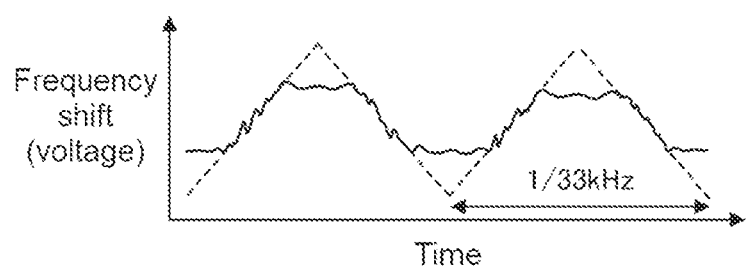
FIG. 9B is a diagram illustrating an example of a waveform of an SSC modulated wave obtained by demodulating the output of a clock recovery device in the related art.
Figure 10:
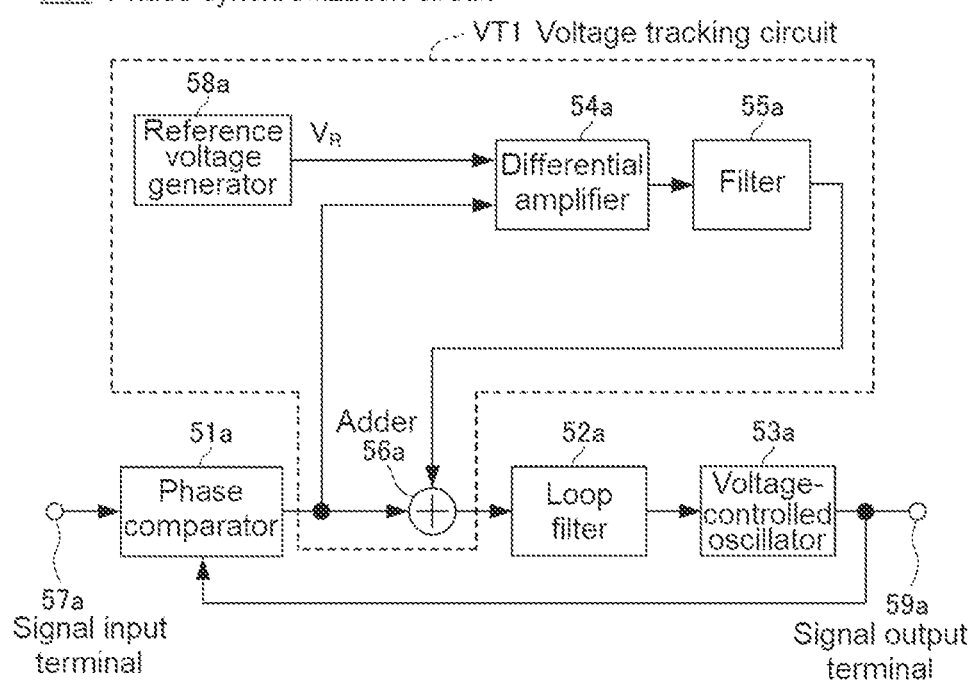
FIG. 10 is a block diagram illustrating a configuration of a phase synchronization circuit in the related art.

Immediately after the analog switch 26 is switched from "disabled" to "enabled" by the switching control unit 63, the waveform of the FM demodulated signal output from the FM demodulation unit 22 is a distorted waveform that looks like a peak portion of the triangle wave is cut off as illustrated in a solid line graph of FIG. 9B. However, in a period in which the triangle wave has the original slope, the frequency deviation between the SSC modulated data signal input to the clock recovery unit 20 and the reference clock is small, and the waveform of the FM demodulated signal is an ideal waveform of the triangle wave as illustrated in FIG. 9A. It should be noted that the FM demodulated signal output from the FM demodulation unit 22 is a voltage signal, and FIGS. 9A and 9B illustrate the voltage of the FM demodulated signal and the frequency shift proportional to the voltage in optional units.

It should be noted that, in a case in which the data signal input to the clock recovery circuit 1 is a signal that is not subjected to the SSC modulation, the analog switch 26 is set to "disabled" by the switching control unit 63, and the reference clock generation unit 10 generates the reference clock that is not subjected to the SSC modulation.

It should be noted that, in a case in which the frequency shift amount of the SSC modulation of the SSC modulated data signal is small, it is difficult for the slope information acquisition unit 32 to detect the slope of the FM demodulated signal, but there is a high possibility that the frequency shift amount of the SSC modulation in the clock recovery unit 20 is within the allowable range, it is not a problem in many cases. For example, the minimum resolution of the setting of the second threshold value by the threshold value control unit 65 may be set in advance within the allowable range of the frequency shift amount of the SSC modulation in the clock recovery unit 20, and in a case in which the outputs of the comparators 31a and 32a are always constant values even when the second threshold value is changed, the analog switch 26 may be set to "disabled" by the switching control unit 63.

Figure 6:
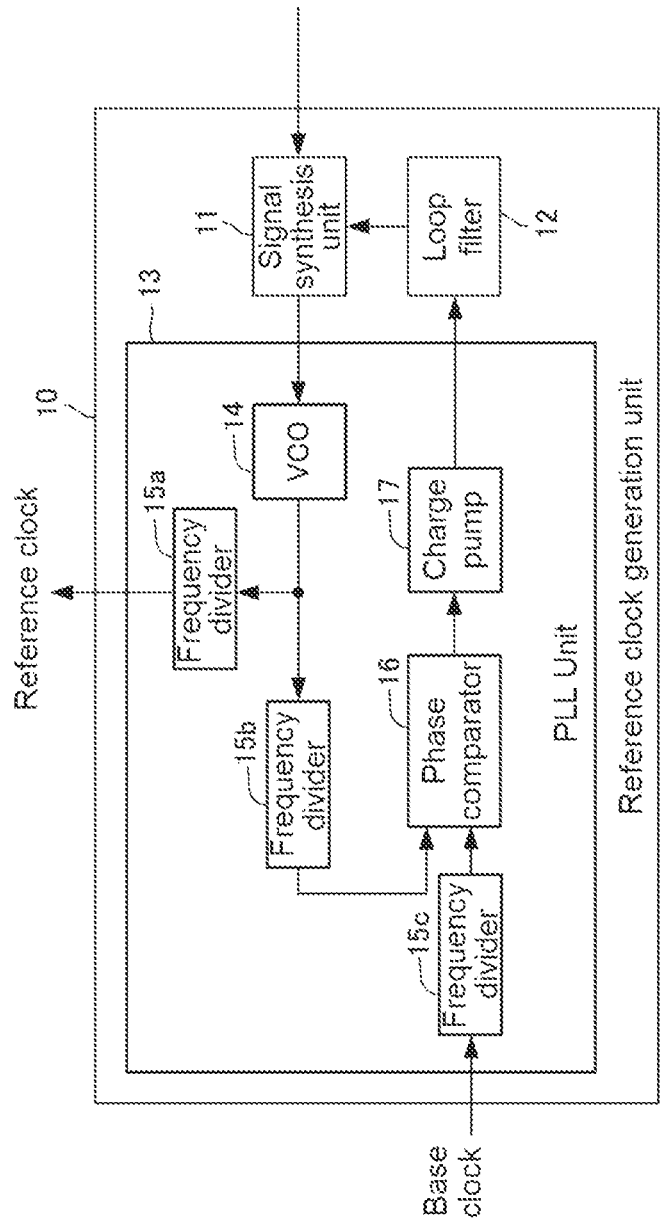
FIG. 6 is a block diagram illustrating a configuration of a reference clock generation unit provided in the clock recovery circuit according to the first embodiment of the present invention.

As illustrated in FIG. 6, the reference clock generation unit 10 has a signal synthesis unit 11, a loop filter 12, and a PLL unit 13. The PLL unit 13 has a VCO 14, frequency dividers 15a to 15c that are programmable frequency dividers, a phase comparator 16, and a charge pump 17.

The signal synthesis unit 11 is configured of, for example, an addition circuit using an operational amplifier, and adds the modulation signal generated by the modulation signal generation unit 30 and the output of the loop filter 12. The output of the signal synthesis unit 11 is input to the VCO 14 as the control voltage.

The VCO 14 receives the output of the signal synthesis unit 11 as the control voltage, modulates the clock of the VCO 14, generates the reference clock having a frequency substantially proportional to the control voltage input from the signal synthesis unit 11, and outputs the generated reference clock as the output signal. The VCO 14 performs control of reducing the frequency deviation between the SSC modulated data signal input to the clock recovery unit 20 and the reference clock and making the frequency of the reference clock to follow the frequency of the SSC modulated data signal.

The frequency divider 15a divides the frequency of the reference clock output from the VCO 14, for example, to a frequency of 1/Na of a baud rate of the SSC modulated data signal, and outputs the reference clock to the clock recovery unit 20. A frequency division ratio Na of the frequency divider 15a is set by the frequency division ratio control unit 61 such that the frequency of the reference clock output from the VCO 14 is a frequency required by the clock recovery unit 20. It should be noted that, in a case in which the reference clock output from the VCO 14 need only be directly input to the clock recovery unit 20, the frequency divider 15a may be omitted.

The frequency divider 15b sets a center frequency of the reference clock output from the VCO 14 to have a relationship of frequency division and multiplication of the base clock input to the frequency divider 15c from an external signal source. The frequency divider 15b divides the frequency of the output signal from the VCO 14 as a feedback signal by a predetermined frequency division ratio Nb, and matches the center frequency of the feedback signal whose frequency is divided with the frequency of the output of the frequency divider 15c. The frequency division ratio Nb of the frequency divider 15b is set by the frequency correction control unit 64.

The frequency divider 15c divides the frequency of the base clock input from the external signal source by a predetermined frequency division ratio Nc, and outputs the base clock to the phase comparator 16. The frequency division ratio Nc of the frequency divider 15c is set by the frequency correction control unit 64. The base clock is a fixed frequency (for example, 40 MHz) clock that is not subjected to the SSC modulation.

The frequency correction control unit 64 sets the frequency division ratio Nb and the frequency division ratio Nc such that the center frequency of the reference clock whose frequency is divided by the frequency divider 15b is matched with the frequency of the base clock whose frequency is divided by the frequency divider 15c.

The phase comparator 16 is configured of, for example, an exclusive OR (EXOR) circuit, and outputs a phase difference signal of the pulse width proportional to the phase difference between the reference clock whose frequency is divided by the frequency divider 15b and the base clock whose frequency is divided by the frequency divider 15c.

The charge pump 17 generates a charge/discharge current in response to the phase difference signal input from the phase comparator 16, and supplies the charge/discharge current to the loop filter 12.

The loop filter 12 converts the charge/discharge current supplied from the charge pump 17 into the voltage, and outputs a signal that is smoothed by removing the high frequency component of the converted voltage to the signal synthesis unit 11. In order to achieve both the purpose of performing the SSC modulation on the clock of the VCO 14 and the purpose of stabilizing the center frequency of the reference clock, a loop bandwidth of the PLL unit 13 including the loop filter 12 is set to a frequency (for example, 10 kHz) narrower than the SSC modulated frequency of 30 to 33 kHz.

As a result, the signal synthesis unit 11 can superimpose the components outside a loop band of the PLL unit 13 on the modulation signal to perform the SSC modulation directly on the VCO 14. In a case in which the SSC modulation is to be performed within the loop band of the PLL unit 13, the modulation is canceled by the feedback.

In a case in which the DC offset component of the FM demodulated signal output from the FM demodulation unit 22 is removed by a DC offset cancellation circuit or the like, the reference clock generated by the reference clock generation unit 10 is subjected to the SSC modulation equivalent to a center spread method. Therefore, in a case in which the SSC modulated data signal input to the clock recovery circuit 1 is an SSC modulated data signal subjected to the SSC modulation of a down spread method or an up spread method, for example, it is desirable to convert the frequency of the reference clock generated by the reference clock generation unit 10 according to the down spread method or the up spread method by a known method as disclosed in JP-A-2018-156647.

Therefore, the frequency correction control unit 64 performs control of shifting the center of the SSC modulated frequency shift obtained from the result of adding the modulation signal by the signal synthesis unit 11 and the output of the loop filter 12 and control of shifting the center frequency of the reference clock output from the VCO 14 according to the spread method of the SSC modulated data signal input to the clock recovery circuit 1. For example, the frequency correction control unit 64 controls the frequency division ratio of the frequency dividers 15b and 15c to control the center frequency of the reference clock to the frequency corresponding to a desired spread method.

The operation unit 27 receives operation input by a user, and is configured of, for example, a touch panel including a touch sensor for detecting a contact position by a contact operation on an input surface corresponding to a display screen of a display device. Alternatively, the operation unit 27 may include an input device such as a keyboard or mouse. The operation input to the operation unit 27 is detected by the control unit 60.

As setting information necessary to generate the reference clock from the SSC modulated data signal input to the clock recovery circuit 1 by the operation input to the operation unit 27 by the user, it is possible to perform settings of whether the data signal input to the clock recovery circuit 1 is the SSC modulated data signal, the bit rate of the SSC modulated data signal, the selection of the spread method, and the like.

The control unit 60 is configured of a microcomputer or personal computer including, for example, a central processing unit (CPU), a read only memory (ROM), a random access memory (RAM), a hard disk drive (HDD), a solid state drive (SSD), controls the operation of each unit configuring the clock recovery circuit 1, and includes the frequency division ratio control unit 61, the gain control unit 62, the switching control unit 63, the frequency correction control unit 64, and the threshold value control unit 65 described above. In addition, the control unit 60 can configure at least a part of the frequency division ratio control unit 61, the gain control unit 62, the switching control unit 63, the frequency correction control unit 64, and the threshold value control unit 65 by software by transferring a predetermined program stored in the ROM or the like to the RAM and executing the program. It should be noted that at least a part of the frequency division ratio control unit 61, the gain control unit 62, the switching control unit 63, the frequency correction control unit 64, and the threshold value control unit 65 can also be configured of a digital circuit, such as an FPGA or an ASIC. Alternatively, at least a part of the frequency division ratio control unit 61, the gain control unit 62, the switching control unit 63, the frequency correction control unit 64, and the threshold value control unit 65 can also be configured of an appropriate combination of hardware processing by the digital circuit and software processing by the predetermined program.

As described above, the clock recovery circuit 1 according to the present embodiment generates the FM demodulated signal obtained by performing the FM demodulation on the output of the clock recovery unit 20, generates the modulation signal that is the SSC modulated wave having the cycle and the slope of the FM demodulated signal, generates the reference clock by performing the SSC modulation on the clock of the VCO 14 using the modulation signal, and feeds back the reference clock subjected to the SSC modulation to the clock recovery unit 20. With this configuration, since the clock recovery circuit 1 according to the present embodiment can restore the modulation signal having an original SSC modulated frequency from the FM demodulated signal, the clock recovery circuit can recover the SSC modulated clock by improving the durability of the clock recovery unit 20 by making the frequency of the SSC modulated data signal to follow the frequency of the reference clock such that a frequency deviation between a degraded and stressed SSC modulated data signal with a large frequency shift due to the SSC modulation and the reference clock is minimized.

In addition, the clock recovery circuit 1 according to the present embodiment generates the triangle wave signal having the cycle and the slope of the FM demodulated signal by digital calculation, and generates the modulation signal by performing the digital-analog conversion of the triangle wave signal. With this configuration, the clock recovery circuit 1 according to the present embodiment can restore the triangle wave signal having the original SSC modulated frequency from the FM demodulated signal to generate the modulation signal.

In addition, the clock recovery circuit 1 according to the present embodiment can use the direct current average value level of the FM demodulated signal as the first threshold value to acquire the period T1 of the half of the cycle of the FM demodulated signal as the cycle information.

In addition, the clock recovery circuit 1 according to the present embodiment can use the second threshold value different from the first threshold value to acquire the high level period T2$h$ or the low level period T2$l$, and can acquire the slope information of the modulation signal from the difference between the high level period T2$h$ or the low level period T2$l$ and the period T1 of the FM demodulated signal.

In addition, the clock recovery circuit 1 according to the present embodiment controls the frequency division ratio of the frequency divider 21 based on the bit rate of the SSC modulated data signal such that the maximum frequency of the SSC modulated clock input to the EXOR circuit 23$b$ is equal to or less than ¼ of the operation upper limit frequency of the EXOR circuit 23$b$. With this configuration, the clock recovery circuit 1 according to the present embodiment can recover the SSC modulated clock from the SSC modulated data signal having a large frequency shift while ensuring the demodulation resolution of the EXOR circuit 23$b$.

Second Embodiment

Next, an error rate measurement apparatus and an error rate measurement method according to a second embodiment of the present invention will be described with reference to the drawings. It should be noted that the same configurations as the configurations in the first embodiment are designated by the same reference numerals, and the description thereof will be omitted as appropriate. In addition, the description of the same operation as the operation of the first embodiment will be omitted as appropriate.

Figure 7:
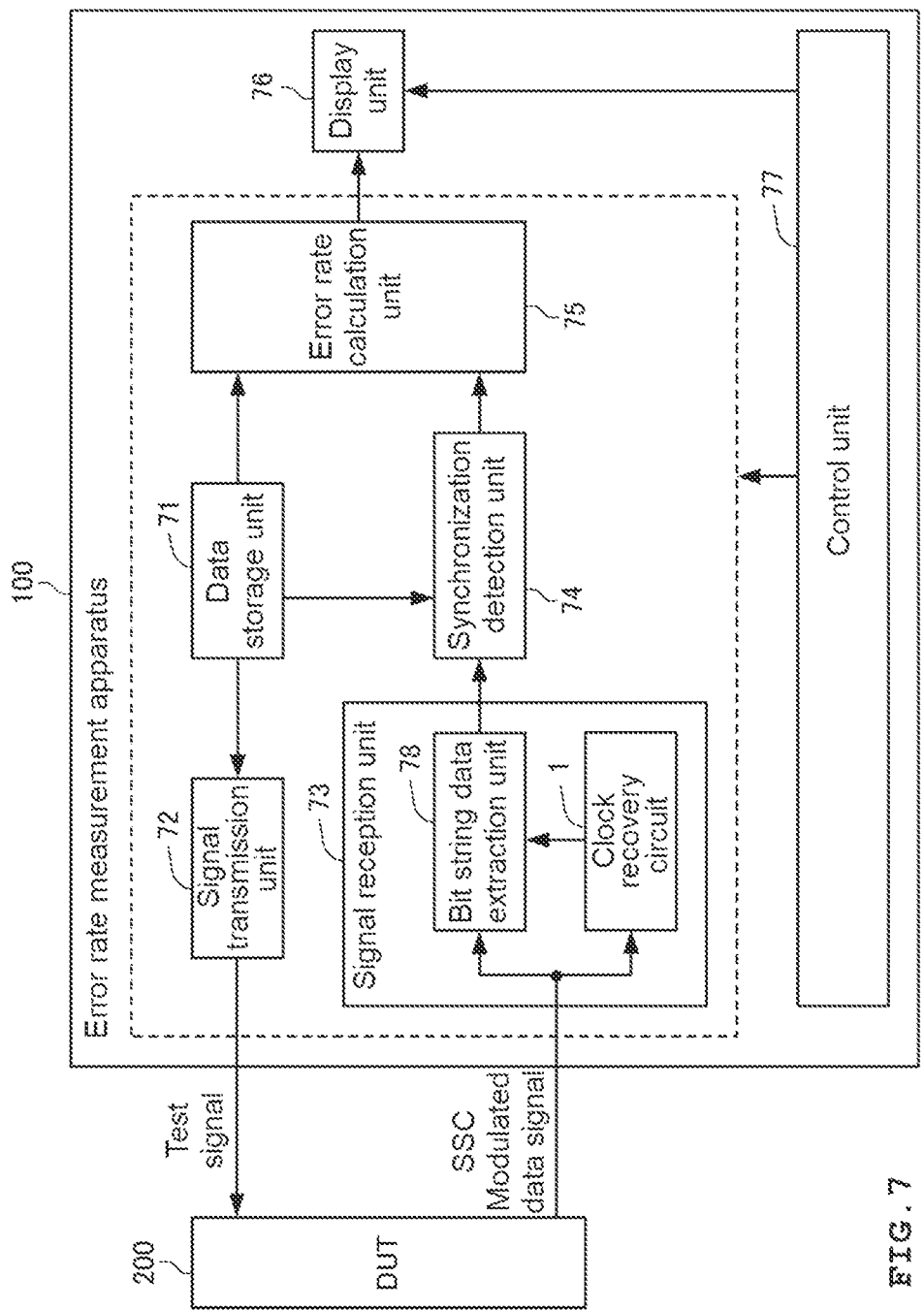
FIG. 7 is a block diagram illustrating a configuration of an error rate measurement apparatus according to a second embodiment of the present invention.

As illustrated in FIG. 7, an error rate measurement apparatus 100 according to the second embodiment measures an error rate of an SSC modulated data signal transmitted from a device under test (DUT) 200, and includes a data storage unit 71, a signal transmission unit 72, a signal reception unit 73, a synchronization detection unit 74, an error rate calculation unit 75, a display unit 76, and a control unit 77.

The DUT 200 outputs the SSC modulated data signal subjected to the SSC modulation at a predetermined SSC modulated frequency. Examples of a standard to which the DUT 200 correspond include PCI Express Gen 1 to 6, USB 3.1 to 4, and DP 1.4 to 2.

The data storage unit 71 is configured of a memory, such as a RAM, and stores bit string data that serves as a reference in advance. Here, the bit string data is data corresponding to K levels from 0 level to K−1 level at which a PAM signal consisting of binary or more multilevel K (K is an integer of 2 or more) can be acquired. For example, the bit string data of a PAM4 signal, which is a quaternary PAM signal, consists of bit combinations of "00", "01", "10", and "11".

The signal transmission unit 72 generates a test signal by performing the SSC modulation on the bit string data read from the data storage unit 71 at a predetermined SSC modulated frequency, and transmits the generated test signal to the DUT 200. In this case, the DUT 200 receives the test signal transmitted from the signal transmission unit 72, and transmits the received test signal to the signal reception unit 73 as the SSC modulated data signal. That is, the DUT 200 transmits a K-value PAM signal that is subjected to the SSC modulation at the predetermined SSC modulated frequency as the SSC modulated data signal.

The signal reception unit 73 receives the SSC modulated data signal transmitted from the DUT 200 to output the bit string data of the received SSC modulated data signal to the synchronization detection unit 74, and includes the clock recovery circuit 1 according to the first embodiment and a bit string data extraction unit 78.

The clock recovery circuit 1 recovers an SSC modulated clock from the SSC modulated data signal transmitted from the DUT 200.

The bit string data extraction unit 78 extracts the bit string data constituting the SSC modulated data signal transmitted from the DUT 200 at the timing of the SSC modulated clock recovered by the clock recovery circuit 1. For example, the bit string data extraction unit 78 has at least one 0/1 determiner, and can determine the level of the SSC modulated data signal transmitted from the DUT 200 at the timing of the SSC modulated clock by inputting the SSC modulated clock from the clock recovery circuit 1 to each 0/1 determiner. It should be noted that the SSC modulated clock output from the clock recovery circuit 1 may be used as an operation clock in each unit that configures the error rate measurement apparatus 100 in addition to the bit string data extraction unit 78.

The synchronization detection unit 74 synchronizes the bit string data read from the data storage unit 71 with the bit string data of the SSC modulated data signal extracted by the bit string data extraction unit 78. Then, the synchronization detection unit 74 outputs the bit string data of the synchronized SSC modulated data signal to the error rate calculation unit 75.

The error rate calculation unit 75 detects an error bit of the bit string data constituting the SSC modulated data signal and calculates the BER of the bit string data constituting the SSC modulated data signal by sequentially comparing the bit string data constituting the SSC modulated data signal output from the synchronization detection unit 74 and the bit string data stored in the data storage unit 71.

The display unit 76 is, for example, configured of a display device, such as a liquid crystal display (LCD) or a cathode ray tube (CRT), and displays various display contents, such as the BER of the bit string data calculated by the error rate calculation unit 75 in response to the control signal output from the control unit 77. Further, the display unit 76 displays operation targets, such as a button, a soft key, a pull-down menu, and a text box for setting various conditions in response to the control signal output from the control unit 77.

The control unit 77 is configured in the same manner as the control unit 60 in the first embodiment, and controls the operation of each unit configuring the error rate measurement apparatus 100. In addition, the control unit 77 can configure at least a part of the error rate calculation unit 75 by software by transferring a predetermined program stored in the ROM or the like to the RAM and executing the program. It should be noted that at least a part of the error rate calculation unit 75 can be configured of a digital circuit, such as an FPGA or an ASIC. Alternatively, at least a part of the error rate calculation unit 75 can be configured of an appropriate combination of hardware processing by the digital circuit and software processing by the predetermined program. It should be noted that the control unit 77 according to the present embodiment may also serve as the control unit 60 according to the first embodiment.

Figure 8:
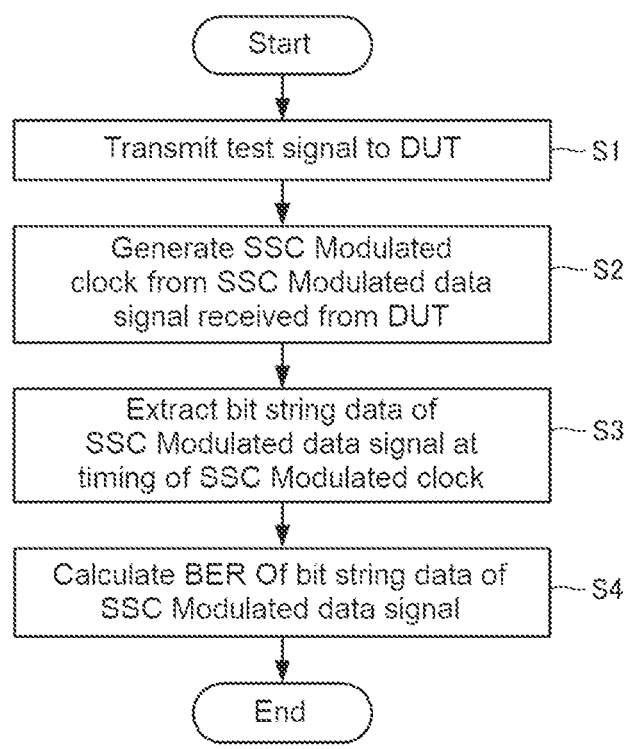
FIG. 8 is a flowchart illustrating processing of an error rate measurement method according to the second embodiment of the present invention.

Hereinafter, an example of processing of the error rate measurement method according to the present embodiment will be described with reference to the flowchart of FIG. 8.

First, the signal transmission unit 72 generates the test signal by performing the SSC modulation on the bit string data read from the data storage unit 71 at the predetermined SSC modulated frequency, and transmits the generated test signal to the DUT 200 (step S1).

Next, the clock recovery circuit 1 receives the SSC modulated data signal subjected to the SSC modulation at the predetermined SSC modulated frequency from the DUT 200, and generates the SSC modulated clock (signal reception step S2).

Next, the bit string data extraction unit 78 extracts the bit string data constituting the SSC modulated data signal at the timing of the SSC modulated clock recovered from the SSC modulated data signal by the clock recovery circuit 1 (signal reception step S3).

Next, the error rate calculation unit 75 calculates the BER of the bit string data constituting the SSC modulated data signal extracted in step S3 (error rate calculation step S4).

As described above, the error rate measurement apparatus 100 according to the present embodiment can receive the K-value PAM signal transmitted from the DUT 200 as the SSC modulated data signal, and can use the clock recovery circuit 1 according to the first embodiment to generate the SSC modulated clock from the SSC modulated data signal. Further, the error rate measurement apparatus 100 according to the present embodiment can extract the bit string data constituting the SSC modulated data signal at the timing of the generated SSC modulated clock, and can measure a BER of the bit string data.

DESCRIPTION OF REFERENCE NUMERALS AND SIGNS

1 Clock recovery circuit
10 Reference clock generation unit
11 Signal synthesis unit
12 Loop filter
13 PLL unit
14 VCO
15$a$ to 15$c$ Frequency divider
16 Phase comparator
17 Charge pump
20 Clock recovery unit
21 Frequency divider
22 FM demodulation unit
23 Delay detection circuit
23$a$ Delay unit
23$b$ EXOR circuit
24 LPF
25 Amplifier
26 Analog switch
30 Modulation signal generation unit
31 Cycle information acquisition unit
31$a$ Comparator
31$b$ Cycle counter
31$c$ Cycle information output unit
32 Slope information acquisition unit
32$a$ Comparator
32$b$ Duty counter
32$c$ Difference calculation unit
32$d$ Slope information output unit
32$e$ Amplitude information calculation unit
33 PLL
40 Triangle wave signal generator
41 Pulse signal output unit
42 Frequency shift direction information output unit
43 Slope output unit
44 Amplitude change amount calculation unit
45 Cumulative addition circuit
50 DAC
61 Frequency division ratio control unit
62 Gain control unit 63 Switching control unit
64 Frequency correction control unit
65 Threshold value control unit
71 Data storage unit
72 Signal transmission unit
73 Signal reception unit
74 Synchronization detection unit
75 Error rate calculation unit
78 Bit string data extraction unit
100 Error rate measurement apparatus
200 DUT

What is claimed is:

1. A clock recovery circuit comprising:
a reference clock generation unit that generates a reference clock subjected to spread spectrum clock (SSC) modulation;
a clock recovery unit that recovers an SSC modulated clock of a data signal subjected to the SSC modulation at a predetermined SSC modulated frequency in synchronization with the reference clock;
a frequency modulation (FM) demodulation unit that performs FM demodulation on the SSC modulated clock recovered by the clock recovery unit to generate an FM demodulated signal; and
a modulation signal generation unit that acquires cycle information indicating a cycle of the FM demodulated signal and slope information indicating a slope of the FM demodulated signal to generate a modulation signal based on the acquired cycle information and slope information,
wherein the reference clock generation unit includes
a voltage-controlled oscillator that outputs an output signal of a frequency corresponding to an input control voltage,
a phase comparator that outputs a phase difference signal corresponding to a phase difference between a base clock having a predetermined frequency and the output signal of the voltage-controlled oscillator,
a charge pump that generates a charge/discharge current in response to the phase difference signal,
a loop filter that outputs a signal obtained by removing a high frequency component from the charge/discharge current, and
a signal synthesis unit that adds the modulation signal generated by the modulation signal generation unit and the output of the loop filter, and
the voltage-controlled oscillator generates the reference clock by modulating a clock of the voltage-controlled oscillator by receiving the output of the signal synthesis unit as the control voltage, to output the generated reference clock as the output signal.

2. The clock recovery circuit according to claim 1,
wherein the modulation signal generation unit includes
a cycle information acquisition unit that acquires the cycle information,
a slope information acquisition unit that acquires the slope information, and
a triangle wave signal generator that generates a triangle wave signal based on the cycle information and the slope information.

3. An error rate measurement apparatus comprising:
a signal reception unit that receives a data signal subjected to SSC modulation at a predetermined SSC modulated frequency; and
an error rate calculation unit that calculates a bit error rate of bit string data constituting the data signal received by the signal reception unit,
wherein the signal reception unit includes the clock recovery circuit according to claim 1, and extracts the bit string data constituting the data signal at a timing of the SSC modulated clock recovered from the data signal by the clock recovery circuit.

4. An error rate measurement method comprising:
a signal reception step of receiving a data signal subjected to SSC modulation at a predetermined SSC modulated frequency; and
an error rate calculation step of calculating a bit error rate of bit string data constituting the data signal received in the signal reception step,
wherein, in the signal reception step, the bit string data constituting the data signal at a timing of the SSC modulated clock recovered from the data signal is extracted by the clock recovery circuit according to claim 1.

5. The clock recovery circuit according to claim 2,
wherein the cycle information acquisition unit uses a direct current average value level of the FM demodulated signal as a first threshold value to acquire a period in which a level of the FM demodulated signal is continuously equal to or more than the first threshold value or a period in which the level of the FM demodulated signal is continuously equal to or less than the first threshold value, as the cycle information.

6. The clock recovery circuit according to claim 2,
wherein the triangle wave signal generator includes
a pulse signal output unit that outputs a pulse signal for each half period of the cycle information,
a frequency shift direction information output unit that outputs frequency shift direction information indicating whether a slope of the triangle wave signal is positive or negative at a timing of the pulse signal,
a slope output unit that outputs the slope obtained by multiplying the frequency shift direction information and the slope information,
an amplitude change amount calculation unit that calculates a value obtained by multiplying the slope output from the slope output unit by a predetermined clock cycle, as an amplitude change amount for each predetermined clock cycle, and
a cumulative addition circuit that generates the triangle wave signal by cumulatively adding the amplitude change amount calculated by the amplitude change amount calculation unit for each predetermined clock cycle.

7. The clock recovery circuit according to claim 2, further comprising:
a frequency divider that divides a frequency of the SSC modulated clock recovered by the clock recovery unit to output the SSC modulated clock to the FM demodulation unit; and
a frequency division ratio control unit that controls a frequency division ratio of the frequency divider,
wherein the FM demodulation unit includes
a delay unit that delays and outputs the SSC modulated clock whose frequency is divided by the frequency divider,
an exclusive OR circuit that calculates an exclusive OR of the output of the frequency divider and the output of the delay unit, and
a low pass filter that smooths the output of the exclusive OR circuit to generate the FM demodulated signal, and
the frequency division ratio control unit controls the frequency division ratio based on a bit rate of the data signal such that a maximum frequency of the SSC modulated clock input to the exclusive OR circuit is equal to or less than ¼ of an operation upper limit frequency of the exclusive OR circuit.

8. The error rate measurement method comprising:
a signal reception step of receiving a data signal subjected to SSC modulation at a predetermined SSC modulated frequency; and
an error rate calculation step of calculating a bit error rate of bit string data constituting the data signal received in the signal reception step;
a signal reception step of receiving a data signal subjected to SSC modulation at a predetermined SSC modulated frequency, wherein the bit string data constituting the data signal at a timing of the SSC modulated clock recovered from the data signal is extracted by the clock recovery circuit according to claim 2;
an error rate calculation step of calculating a bit error rate of bit string data constituting the data signal received in the signal reception step; and
in the generation of the triangle wave signal,
outputting a pulse signal for each half period of the cycle information;
outputting frequency shift direction information indicating whether a slope of the triangle wave signal is positive or negative at a timing of the pulse signal;
outputting the slope obtained by multiplying the frequency shift direction information and the slope information;
calculating a value obtained by multiplying the slope by a predetermined clock cycle, as an amplitude change amount for each predetermined clock cycle; and
generating the triangle wave signal by cumulatively adding the amplitude change amount for each predetermined clock cycle.

9. An error rate measurement apparatus comprising:
a signal reception unit that receives a data signal subjected to SSC modulation at a predetermined SSC modulated frequency; and
an error rate calculation unit that calculates a bit error rate of bit string data constituting the data signal received by the signal reception unit,
wherein the signal reception unit includes the clock recovery circuit according to claim 2, and extracts the bit string data constituting the data signal at a timing of the SSC modulated clock recovered from the data signal by the clock recovery circuit.

10. The clock recovery circuit according to claim 5,
wherein the slope information acquisition unit includes
a high/low level period acquisition unit that acquires a high level period in which the level of the FM demodulated signal is continuously equal to or more than a second threshold value different from the first threshold value or a low level period in which the level of the FM demodulated signal is continuously equal to or less than the second threshold value,
a difference calculation unit that calculates a difference between the cycle information and the high level period or the low level period, and
a slope information output unit that outputs an absolute value of a value obtained by dividing a difference between the first threshold value and the second threshold value by a half of the difference calculated by the difference calculation unit, as the slope information.

11. The error rate measurement method according to claim 4, further comprising:
in the acquisition of the cycle information, using a direct current average value level of the FM demodulated signal as a first threshold value to acquire a period in which a level of the FM demodulated signal is continuously equal to or more than the first threshold value or a period in which the level of the FM demodulated signal is continuously equal to or less than the first threshold value, as the cycle information.

12. The error rate measurement method according to claim 11, further comprising:
in the acquisition of the slope information,
acquiring a high level period in which the level of the FM demodulated signal is continuously equal to or more than a second threshold value different from the first threshold value or a low level period in which the level of the FM demodulated signal is continuously equal to or less than the second threshold value;
calculating a difference between the cycle information and the high level period or the low level period; and
outputting an absolute value of a value obtained by dividing a difference between the first threshold value and the second threshold value by a half of the difference, as the slope information.

* * * * *